(12) United States Patent
Crivat et al.

(10) Patent No.: US 7,899,776 B2
(45) Date of Patent: Mar. 1, 2011

(54) EXPLAINING CHANGES IN MEASURES THRU DATA MINING (75) Inventors: Ioan Bogdan Crivat, Redmond, WA (US); Cristian Petculescu, Redmond, WA (US); Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 901 days.

(21) Appl. No.: 11/772,480

(22) Filed: Jul. 2, 2007

(65) Prior Publication Data

US 2009/0012919 A1    Jan. 8, 2009

(51) Int. Cl.
*G06F 17/00* (2006.01)
*G06N 5/04* (2006.01)
(52) U.S. Cl. .......................................................... 706/60
(58) Field of Classification Search .................. 706/60; 700/200
See application file for complete search history.

(56) References Cited

U.S. PATENT DOCUMENTS

| | | | |
|---|---|---|---|
| 6,006,223 A | 12/1999 | Agrawal | |
| 6,185,549 B1 | 2/2001 | Rastogi | |
| 6,272,478 B1 | 8/2001 | Obata | |
| 6,278,998 B1 * | 8/2001 | Ozden et al. ........................ | 1/1 |
| 6,301,575 B1 | 10/2001 | Chadha | |
| 6,311,179 B1 | 10/2001 | Agarwal | |
| 6,687,693 B2 | 2/2004 | Cereghini | |
| 6,970,882 B2 | 11/2005 | Yao | |
| 7,007,020 B1 | 2/2006 | Chen | |
| 2003/0084014 A1 * | 5/2003 | Sohrabi et al. .................. | 706/20 |
| 2005/0262014 A1 * | 11/2005 | Fickes ............................. | 705/38 |
| 2005/0283459 A1 | 12/2005 | MacLennan | |
| 2006/0136462 A1 | 6/2006 | Campos | |

OTHER PUBLICATIONS

'Integrating data mining with SQL databases: OLE DB for data mining': Netz, 2001, IEEE, 1063-6382/01, pp. 379-387.*
Usama Fayyad, et al. From Data Mining to Knowledge Discovery in Databases. American Association for Artificial Intelligence, 1996. http://www.aaai.org/AITopics/assets/PDF/AIMag17-03-2-article. pdf. Last accessed May 23, 2007.
Rakesh Agrawal, et al. Fast Algorithms for Mining Association Rules. http://citeseer.ist.psu.edu/cache/papers/cs/1451/http:zSzzSzwww.almaden.ibm.comzSzcszSzpeoplezSzragrawalzSzpaperszSzvldb94_rj.pdf/agrawal94fast.pdf. Last accessed May 23, 2007.
Ashok Savasere, et al. Mining for Strong Negative Associations in a Large Database of Customer Transactions http://citeseer.ist.psu.edu/cache/papers/cs/2754/http:zSzzSzwww.cc.gatech.eduzSzcomputingzSzDatabasezSzpaperszSzicde98_2.pdf/savasere98mining.pdf. Last accessed May 23, 2007.
Sunita Sarawagi. Explaining differences in multidimensional aggregates. Proceedings of the 25th VLDB Conference. Edinburgh, Scotland, 1999.
International Search Report mailed Jan. 19, 2009 for PCT Application Serial No. PCT/US2008/067363, 12 Pages.

* cited by examiner

*Primary Examiner* — Michael B. Holmes
*Assistant Examiner* — Peter Coughlan
(74) *Attorney, Agent, or Firm* — Workman Nydegger (57) ABSTRACT

Systems and methodologies for identification of factors that cause significant shifts in transactions in a relational store and/or OLAP environment. Transactions are grouped into significant categories defined across the whole data space, to detect interesting sub spaces transactions. Subsequently, sub spaces that show strong variance between two slices can be selected, followed by grouping the subspaces in sub reports to measure the coverage for each sub report. A final report can then be generated that contains list of sub-reports detected in the previous acts.

11 Claims, 10 Drawing Sheets

EXPLAINING CHANGES IN MEASURES THRU DATA MINING

BACKGROUND

Data warehouses typically store substantial quantities of information, and further strive to facilitate expeditious querying and efficient retrieval of such stored data. In general, a data warehouse is a nonvolatile repository that can store a substantial amount of data, such as historical and/or current information—wherein the historical data can correspond to past transactional or operational information.

Accordingly, data warehousing and associated processing mechanisms (e.g., On-Line Analytical Processing (OLAP), Relational OLAP (ROLAP), Multidimensional OLAP (MOLAP), and Hybrid OLAP (HOLAP)) are widespread technologies employed to support business decisions and data analysis. Data warehouses are populated at regular intervals with data from one or more heterogeneous data sources, for example from multiple transactional or enterprise resource planning (ERP) systems. The aggregation of data can provide a consolidated view of an organization from which valuable information are derived.

Moreover, databases associated with such systems can organize and store data in a plurality of multidimensional tables, wherein the tables contain a series of rows (e.g., also referred to as records.) Each row provides particular information about a particular item such as a customer. Rows can further be divided into sections called columns. The intersection between a row and column is typically referred to as a field. Moreover, each field provides data or information related to a particular item. The columns specify the particular type of data provided in each field. For example, a table can be established for purchases of a particular product. Such table can include a plurality of rows corresponding to individual customers, and several columns for first name, last name, address, state, zip code, number of products purchased, price, date, and the like.

Database engines or management systems provide systems and mechanisms to retrieve and manipulate data from database tables upon specification of a query by a user. For example, OLAP describes category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things.

Multidimensional databases and other databases modeled as multidimensional employ a multidimensional query language such as MDX (MultiDimensional expressions) to retrieve and interact with data. More specifically, data can be retrieved utilizing the query language to define or describe specifically the data to be retrieved, for example employing select, where and from clauses. Subsequently, an execution engine receives the query definition and returns the requested data.

Typically, queries are processed in an operator tree, wherein data flows through such operator tree to calculate an answer for the query. Accordingly, queries against data warehouse and/or decision support systems commonly become complex, and hence require prolonged processing time for a vast amount of data. Moreover, the earlier that non-qualifying data are eliminated in such processes, the more efficient the complex queries can be executed.

In such schemas, a plurality of large fact tables (e.g., sales details) can be connected with multiple dimension tables (e.g., product information, sales region, and the like). Typical queries against such schemas consist of multiple joins of the fact table with several dimension tables. Moreover, database administrators typically employ such tables (and cubes in OLAP environments) to generate a report explaining shifts in total sales for different periods. As such, identifying data slices that can facilitate generation of accurate reports for tracking of transactions can be challenging.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation identifies factors that cause significant shifts in transactions (e.g., changes beyond a predetermined threshold) in a relational store and/or On-Line Analytical Processing (OLAP) environment, via employing a detection component. Such detection component employs data mining techniques to detect groups of transactions that are deemed important cross whole data spaces. Attributes of such transactions are subsequently analyzed by training association rules across typically all features of the transaction (e.g., customer demographics, product sold, and the like). Accordingly, sub-slices such as Column/Value pairs employed as WHERE clauses, for which the aggregation of the target measure (SUM(Sales)) changes considerably (e.g., beyond a designated threshold) between the original slices/sub-slices can be identified. Moreover, measures to objectively evaluate the total shift in transaction (e.g., sales) can be covered by such slices.

In a related aspect, upon detecting the most interesting sub-spaces for each slice, a selection component selects sub-spaces that demonstrate a strong variance (e.g., exceeding a predetermined threshold). Additionally, a grouping component can group the sub-spaces in sub reports and measure the coverage for each sub-report. A final report can then be generated and the total coverage computed.

According to a related methodology, transactions are grouped into significant categories defined across the whole data space\ to detect interesting sub spaces transactions. A group can be defined as a conjunction of WHERE clauses on top of the data. In addition, a group can be deemed interesting if such group exceeds a minimum number of transactions, and/or the transactions in the group narrowly project on the Sales Amount axis; wherein association rules can facilitate detecting such groups. Subsequently, sub spaces that show strong variance between two slices can be selected, followed by grouping the subspaces in sub reports to measure the coverage for each sub report. A final report can then be generated that contains list of sub-reports detected in the previous acts, and which are sorted according to total coverage score for each report.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
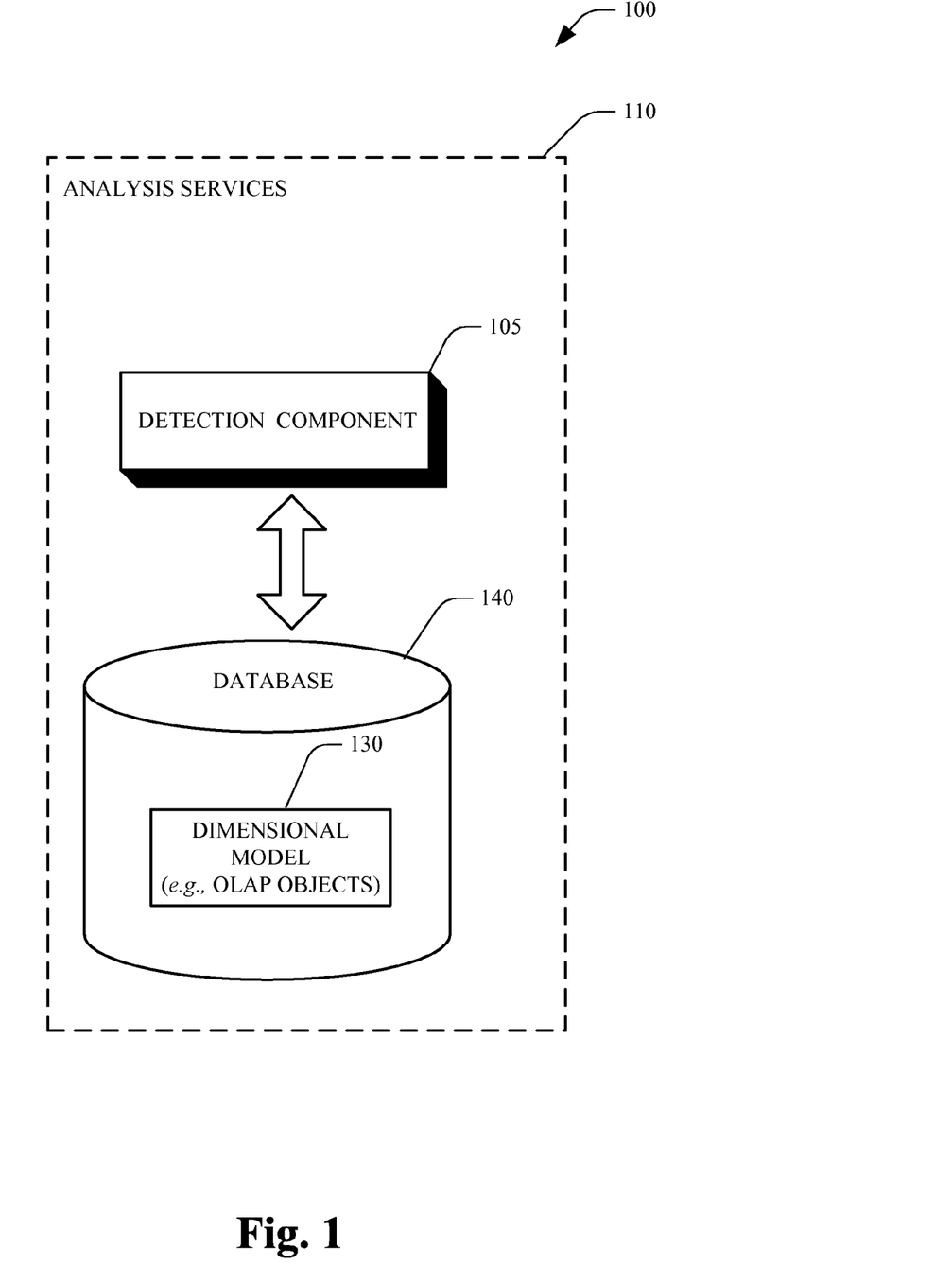
FIG. 1 illustrates a block diagram of a detection component that identifies factors causing shifts in transactions according to an aspect of the subject innovation.

FIG. 1 illustrates a block diagram of a system 100 that employs a detection component 105 in accordance with an aspect of the subject innovation. The system 100 can be associated with the multidimensional database 140, which employs a data model for organizing data that is optimized for data warehouses, online analytic processing (OLAP), and data mining applications. Conceptually, data in the multidimensional database 140 can be stored in cubes defined via multiple dimensions (i.e., three or more) and measures rather than tables, rows, and columns in a relational database. Dimensions are cube attributes that describe a similar set of members upon which a user may wish to base analysis. Furthermore, dimension categories or levels can be arranged hierarchically. For example, a time dimension may include levels for year, month, day, hour, and the like. A geography dimension may include levels for country, state, city and the like. Measures are the values, usually numeric, that are aggregated and analyzed.

The detection component 105 employs data mining techniques to detect groups of transactions that are deemed important cross whole data spaces associated with the database 140. For example, the detection component 105 can interact with Multi-Dimensional eXpressions (MDX) commands that are constructed, to identify factors that cause significant shifts in transactions. In general, MDX is a syntax that supports the definition and manipulation of multidimensional objects and data thereby facilitating the access of data from multiple dimensions easier and more intuitive. MDX is similar in many ways to the SQL (Structured Query Language) syntax (but is not an extension of the SQL language). As with an SQL query, each MDX query requires a data request (the SELECT clause), a starting point (the FROM clause), and a filter (the WHERE clause). These and other keywords provide the tools used to extract specific portions of data from a cube for analysis. MDX also supplies a robust set of functions for the manipulation of retrieved data, as well as the ability to extend MDX with user-defined functions.

For example, the detection component 105 can identify sub-slices (Column/Value pairs, to be employed as WHERE clauses) for which the aggregation of the target measure (SUM(Sales)) changes considerably between the two original slices (e.g., Year=2002 and Year=2003). Hence for each slice (e.g., wherein an attribute remains constant) attributes of transactions can be analyzed by training association rules as described in detail infra. Accordingly, sub-slices such as Column/Value pairs employed as WHERE clauses, for which the aggregation of the target measure (SUM(Sales)) changes considerably between the original slices/sub-slices can be identified. Moreover, measures to objectively evaluate the total shift in transaction (e.g., sales) can be covered by such slices.

Figure 2:
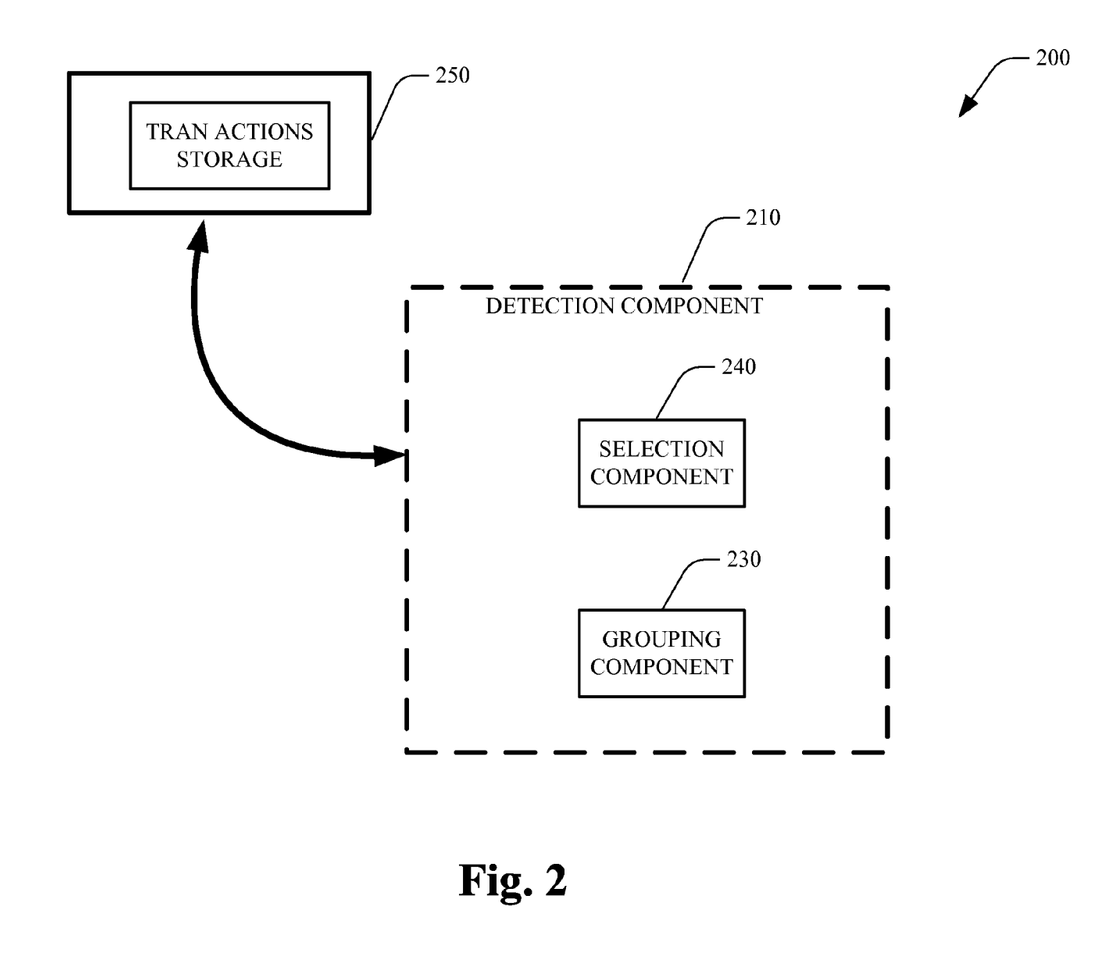
FIG. 2 illustrates a detection component that further includes a selection component for selection of sub-spaces, in accordance with a further aspect of the subject innovation.

FIG. 2 illustrates a detection component 210 that further includes a selection component 210 for selecting sub-spaces, which demonstrate a strong variance (e.g., exceeding a predetermined threshold) in accordance with an aspect of the subject innovation. Additionally, a grouping component 230 can group the sub-spaces in sub reports and measure the coverage for each sub-report. A final report can then be generated and the total coverage computed. As such, transactions can be grouped into significant categories defined across the whole data space, to detect interesting sub spaces transactions. A group can be defined as a conjunction of WHERE clauses on top of the data. Such group can be deemed interesting if it exceeds a minimum number of transactions, and/or the transactions in the group narrowly project on the Sales Amount axis, wherein association rules can facilitate detecting such groups. Likewise, a sub-space can be defined as a set of conditions that define a category of transactions. A subspace is represented as a WHERE-clause containing a conjunction of columns and their values. An example of such subspace is:"[Marital Status]='M' AND [StateProvinceName]='California'". As described in detail infra, sub spaces that show strong variance between two slices can be selected, followed by grouping the subspaces in sub reports to measure the coverage for each sub report. A final report can then be generated that contains list of sub-reports detected in the previous acts, and which are sorted according to total coverage score for each report. As illustrated in FIG. 2, the transactions can be stored in a transaction storage 250 that can be an SQL database or an OLAP cube. For example, the transaction storage 250 can include information about the transactions, such as: customer demographics, e.g., income, age, location, previous purchases of the same or different products, and the like. This information can also include product information such as, for example, category, subcategory, product name, product cost, product price, and the like.

Figure 3:
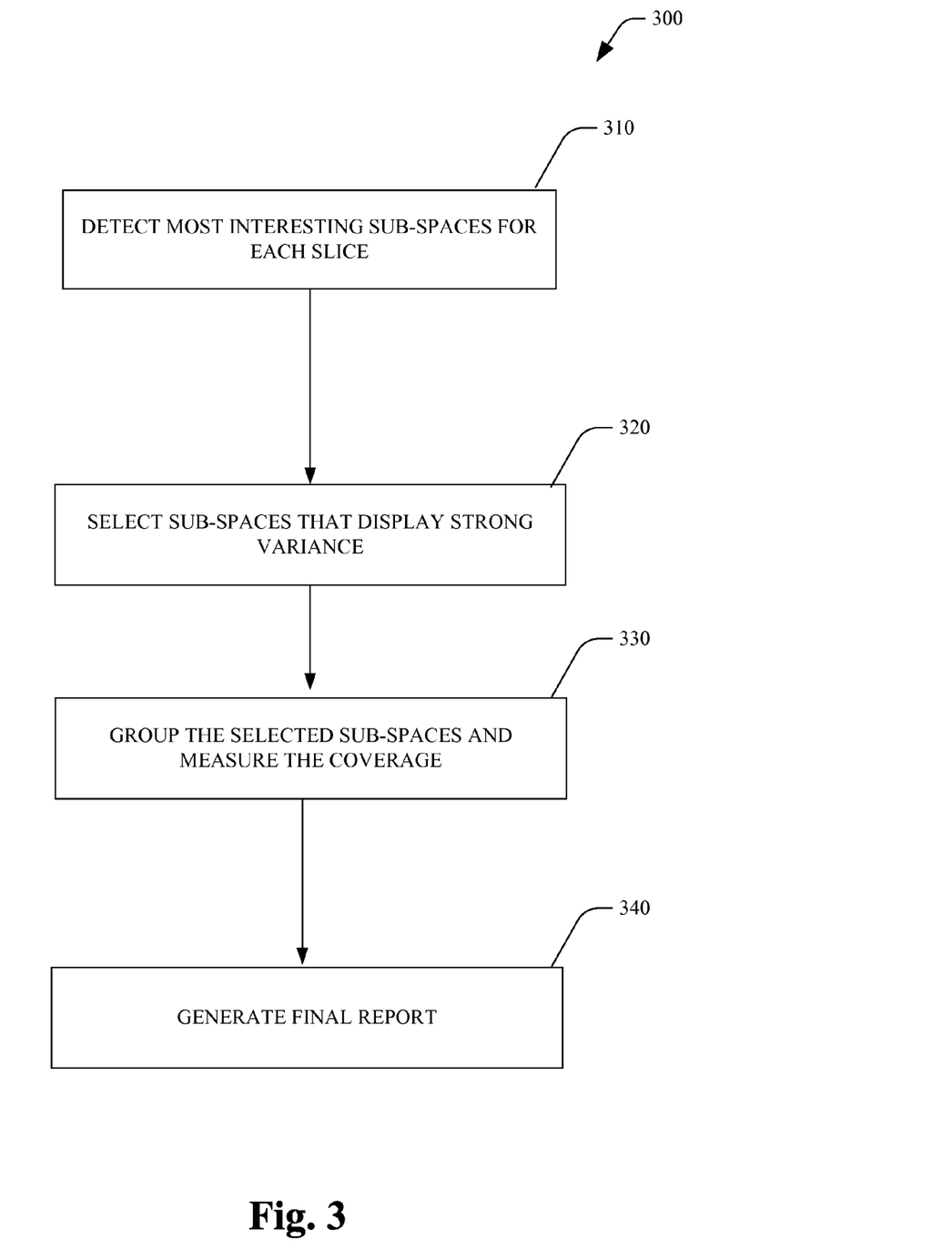
FIG. 3 illustrates a methodology of identifying factors that cause significant shifts in transactions in relational store/OLAP environments, in accordance with an aspect of the subject innovation.

FIG. 3 illustrates a methodology 300 of identifying factors that cause significant shifts in transactions in relational store/OLAP environments in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 310 the most interesting subspaces for each slice can be detected. Next, and at 320 sub-spaces that display strong variance between the two slices can be selected. At 330 the subspaces can be grouped in sub-reports and the coverage for each sub-report thus measured. Subsequently, the final report can be generated and the total coverage computed at 340. Such acts of methodology 300 are described in detail in conjunction FIG. 4 and the discussion below.

Figure 4:
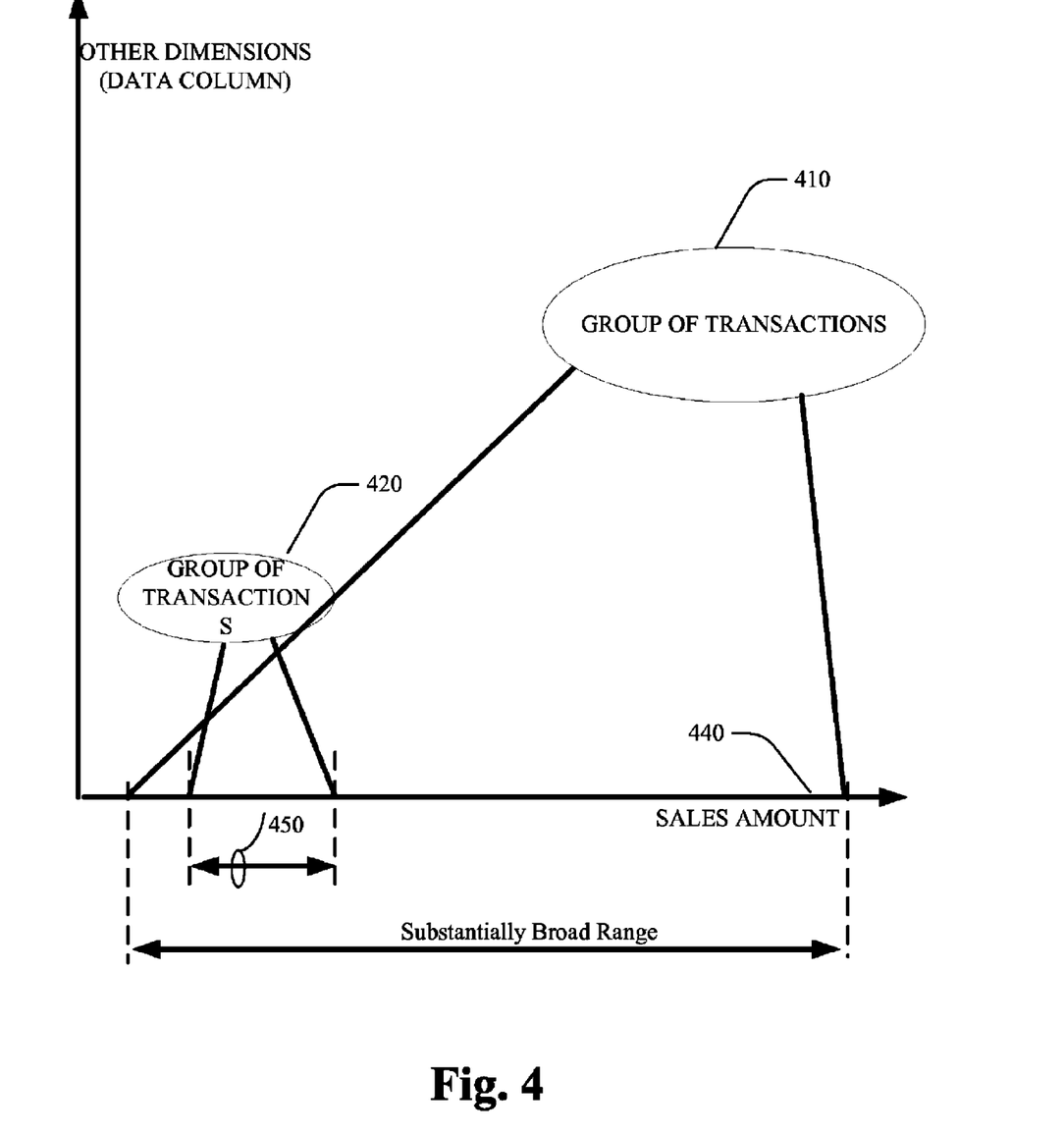
FIG. 4 illustrates a particular example for detection of interesting subspaces for each slice, wherein transactions are grouped into significant categories.

FIG. 4 illustrates a particular example for detection of interesting subspaces for each slice, wherein transactions are grouped into significant categories (which are defined across the whole data space.) In general, a group of transactions 410 that is defined as by [Gender]='M' is deemed not interesting because, merely having knowledge that a customer is Male does not supply substantial information about the Sales amount. In contrast, and as illustrated in FIG. 4 the group of transactions 420 can be deemed descriptive, wherein the Sales Amount indicated by the horizontal axis 440 for all transactions belonging to the group 420 falls in a substantially narrow range 450. Accordingly, a group of transactions can be considered interesting if it exceeds a minimum number of transactions, and/or the transactions in the group narrowly project on the Sales Amount axis. In addition, such groups can typically be readily detected by employing association rule algorithms, to map data space to discrete categories (e.g., buckets) on the "sales amount" axis 440. For example, associations rule algorithms are configurable to: require a minimum support (as percentage or probability) for the transaction groups, and further require a predetermined probability threshold for the rule to effectively allow a user to control how many transactions in a group can be considered outliers before dismissing the whole group. Moreover, such association rule algorithms allow filtered extraction of the rules after training, (e.g., the most important rules, based on support.)

Selection of Sub Spaces that Indicate Strong Variance between Slices (Act 320 of FIG. 3)

Once the transaction groups for a slice are detected (e.g., via employing Association Rules) for both slices, the subject innovation extracts the top (e.g., MAX=50) most interesting transaction groups (rules) from each slice.

For example, for tracking transactions (e.g., sales) related to slices associated with years 2002 & 2003, upon detection of transaction groups, the subject innovation can extract the top most interesting transaction groups/rules from each slice. Accordingly, the following exemplary scenarios can be encountered. In one scenario a transaction appears only in one of the slices (year 2002 or year 2003). Such a group is typically a good candidate for the final report.

If the thresholds for detecting transaction groups are the same in both models, then a group can be missing because either; transaction points in general do not appear in one of the slices (e.g., a new bike model was introduced in 2003 and was not available in 2002, hence an interesting pattern)—or—transaction points exist yet their projection is scattered across the Sales Amount axis 440 (which indicates a change in the shopping behavior).

Likewise, in another scenario a transaction appears in both slices (year 2002 and year 2003), and it will be considered only once. As such, the final list of candidate groups contains at most 2*MAX transaction groups (e.g., 100 groups). Thus, the aggregated measure (SUM–Sales Amount)) for each group can be computed across both slices. Furthermore, if the difference between results exceeds a predetermined threshold (e.g., 10%), then the group can be included in the final report—otherwise, it is excluded.

Each group to be included in the final report can be converted to a WHERE clause (or sub-slice); and/or measured for the total contribution to the global shift in sales amount 440. In one particular aspect, the measure for one transactions group can be defined as the percentage of the total shift in Sales Amount described by such subspace:

$$\Delta G_1 = 100 * \left| \frac{\sum_{2003}(x \cdot SalesAmount \mid x \in G_i) - \sum_{2002}(x \cdot SalesAmount \mid x \in G_i)}{\sum_{2003} x \cdot SalesAmount - \sum_{2002} x \cdot SalesAmount} \right|.$$

Group of Sub-Spaces in Sub Reports and Measure of Coverage for each sub-report (act 330 of FIG. 3)

Typically, subspaces determined earlier can be grouped in sub-reports, which cover sets of dimensions (data columns or OLAP attributes), wherein two subspaces can be grouped in the same sub-report if one of them contains all the dimensions that define the other. For example, in case of a relational data source the grouping algorithm of the subject innovation can include generating a stand-alone sub-report by a first subspace. Subsequently, for each new subspace if an existing sub-report already exists, it can then be merged in the stand alone sub-report. Otherwise, a new standalone sub-report can be generated.

Likewise, in case of an OLAP data source, the algorithm of the subject innovation can take into considerations the hierarchical layout of the dimensions. For example, a subspace defined as [SubCategory]='Mountain Bikes' can be merged with a sub-report defined by [Category] or by [Product Name], as each of these dimensions implies the existence of the SubCategory dimension. For each sub-report, a coverage can then be computed, wherein the subspaces inside a sub-report can have an empty intersection; such as 1: [EnglishCountryName]='Australia' and [SubCategory]='Mountain Bikes'
2: [EnglishCountryName]='Canada' and [SubCategory]='Road Bikes'

Alternatively, subspaces inside a sub-report can have non-empty intersection; such as:

1: [EnglishCountryName]='Canada'
2: [EnglishCountryName]='Canada' AND [StateProvinceName]='British Columbia Accordingly, in the case of a relational data source, the coverage score for a sub-report ($\Delta R$) is defined as the maximum sum of subspace measures ($\Delta G_i$) across a subset(S) of sub- spaces with empty intersection;

$$\Delta R = \text{Max}\left(\sum_{G_i \in S} \Delta G_i \;\middle|\; G_i \cap G_j = \emptyset, \forall G_i, G_j \in S, i \neq j\right)$$

Moreover, for an OLAP data source, attribute hierarchies are also taken into account when computing the intersection of two subspaces.

Generate Final Report and Compute the Total Coverage (act 340 of FIG. 3)

The final report contains the list of sub-reports detected in the previous acts described above, and sorted according to the total coverage score of each sub-report. Since such sub-reports can contain different dimension sets, one cannot assume their intersection to be empty. Therefore, the total coverage that can be guaranteed by the total report is the maximum coverage score for each sub-report.

Figure 5:
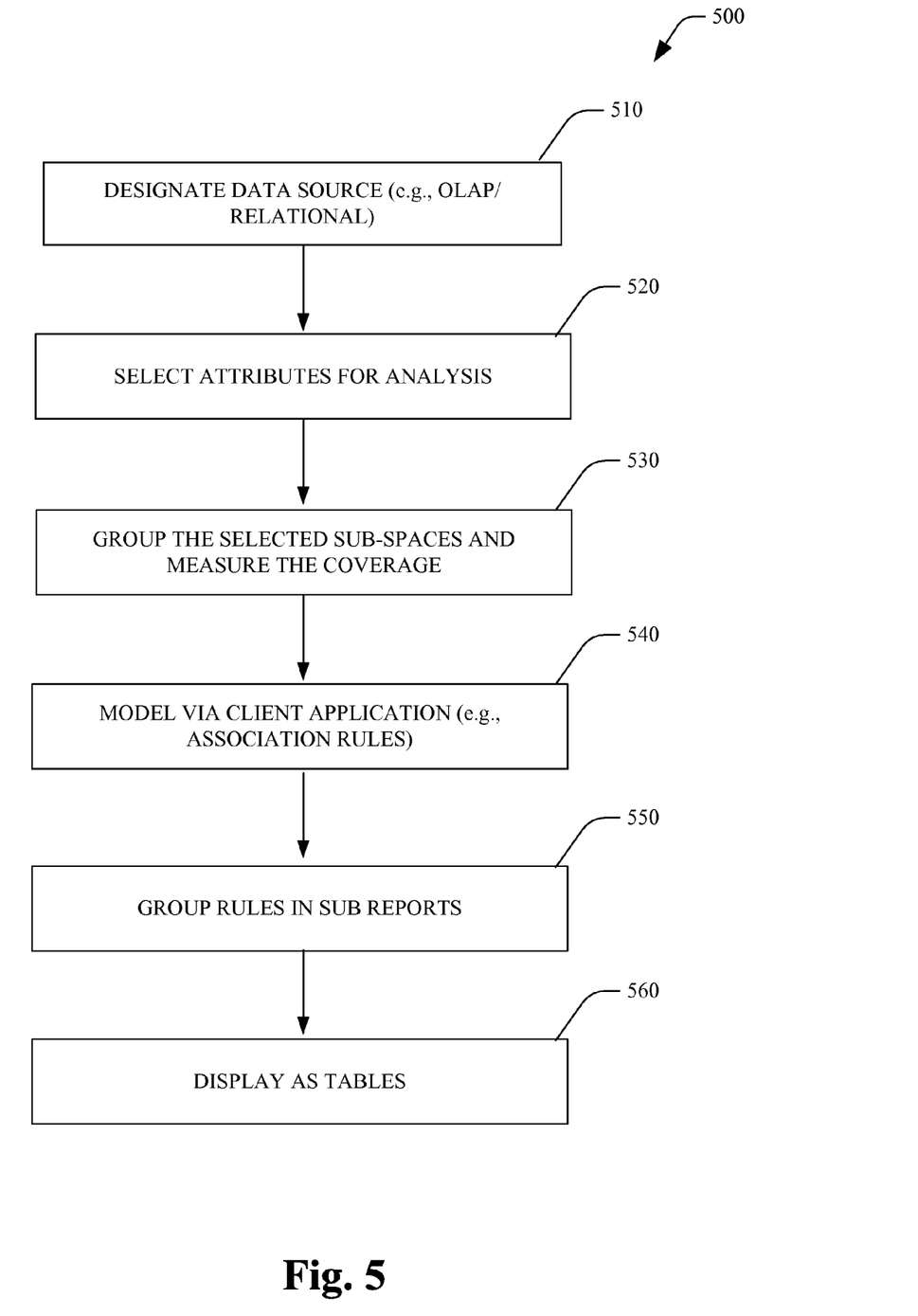
FIG. 5 illustrates a related methodology of contribution of a subspace/sub report to the shift in value of the aggregated measure in accordance with an aspect of the subject innovation.
Figure 6:
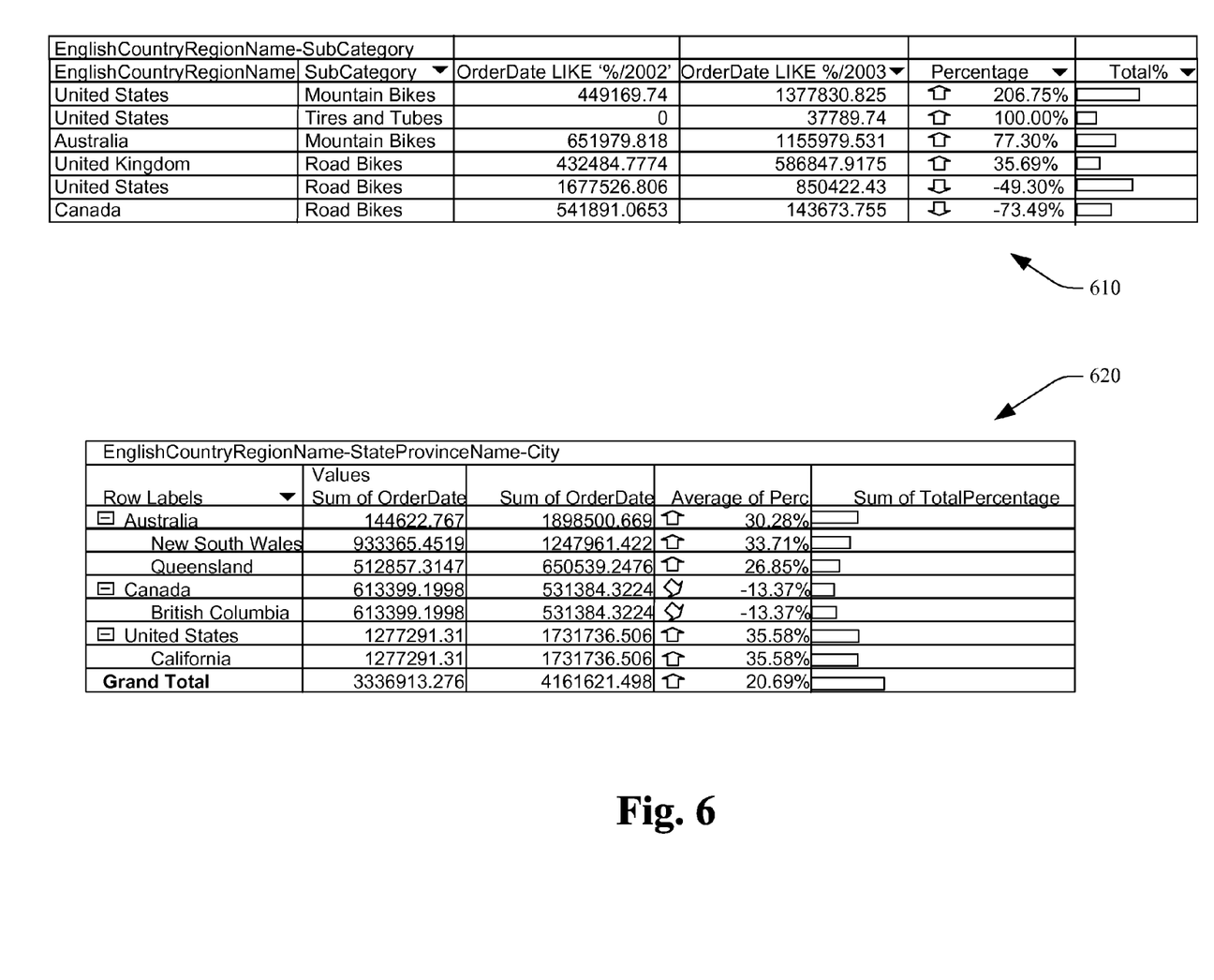
FIG. 6 illustrates exemplary tables rendered in accordance with an aspect of the subject innovation.

FIG. 5 illustrates a related methodology 500 of contribution of a subspace/sub report to the shift in value of the aggregated measure in accordance with an aspect of the subject innovation. Initially and at 510, a data source (e.g., OLAP or relational) can be designated. Next, and at 520 attributes to be employed in an analysis (as well as the aggregated measure whose shift has to be analyzed) are selected. At 530, slices can be defined (e.g., via a visual slicer) and optionally the predetermined threshold can further be designated. Modeling can then be performed by the client application at 540. Such act 540 can further encompass creating association rules for each slice, and the models can employ all data as input and mark the target aggregated measure (sales amount) as predictable to process models. Next, and at 550 rules (e.g., significant subspaces) can be extracted and grouped in sub reports/final report), wherein such reports can rendered as a table at 560. Examples of such tables are illustrated in FIG. 6, wherein the report 610, 620 visually highlights the evolution for each of the subspaces (up, down), and the contribution of the subspaces (and sub-reports) to the shift in value of the aggregated measure (sum of total percentage illustrated in FIG. 6).

Figure 7:
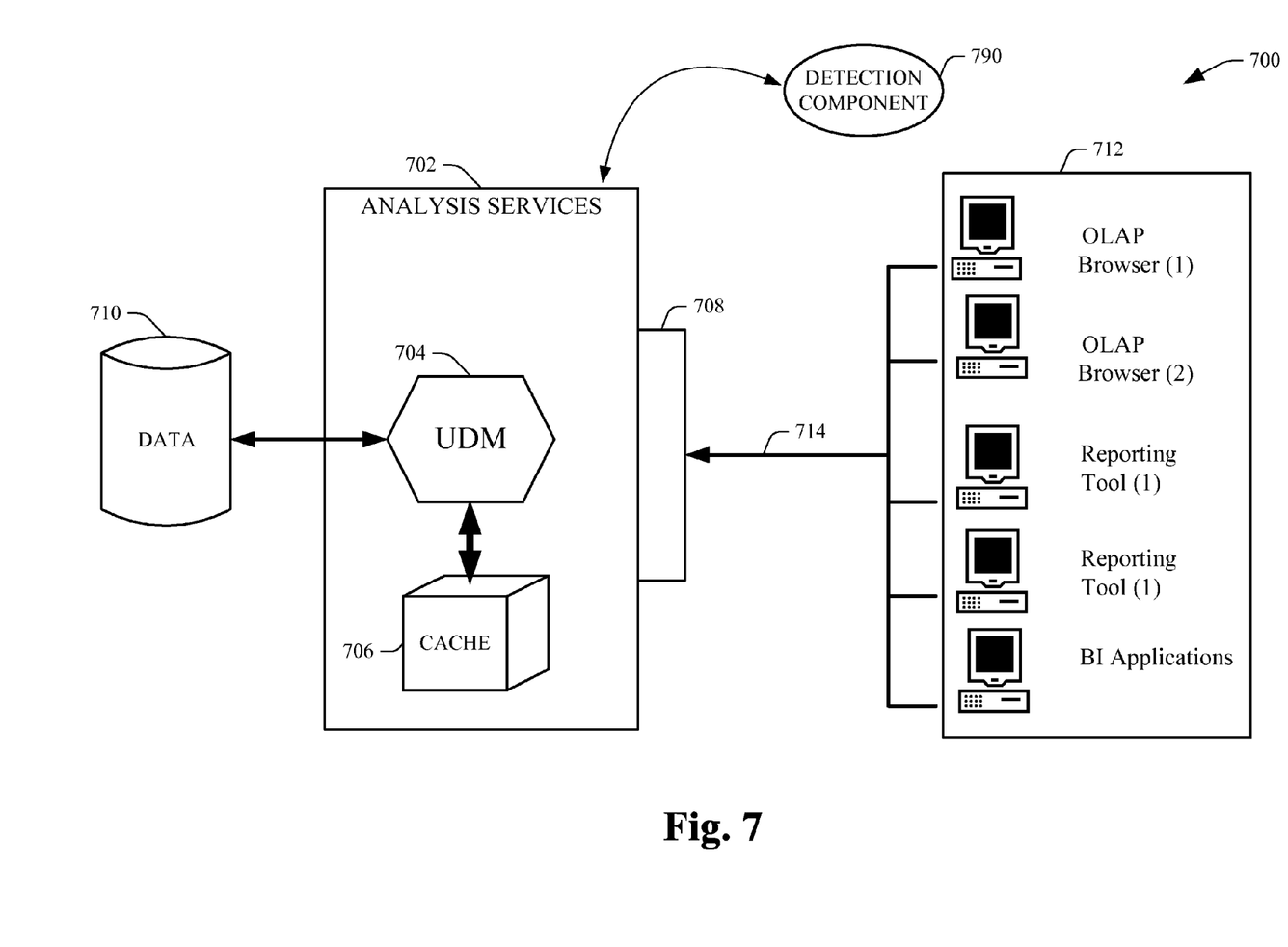
FIG. 7 illustrates a block diagram for a system that can employ a detection component to identify factors that cause significant shifts in transactions according to a particular aspect of the subject innovation.

FIG. 7 illustrates a further block diagram 700 that can employ a detection component 790 to identify factors that cause significant shifts in transactions related to the system 700 in accordance with an aspect of the subject innovation. This typical environment 700 comprises an analysis services component 702 linked to a data source 710 and user interfaces 712. The user interfaces 712 are comprised of OLAP browsers, reporting tools, and other BI (Business Intelligence) applications and the like. The analysis services component 702 typically has an interface 714 with the user interfaces 712 via interfaces 708 like XML/A (eXtensible Markup Language/Analysis) and MDX (Multidimensional Exchange Language) and the like. The analysis services component 702 is comprised of a UDM (Unified Dimensional Model) component 704 and a cache 706. In this example, the detection component 790 can be hosted by the analysis services component 702 via the UDM component 704 and the cache 706. The UDM component 704 can proactively access the cache 806 and/or the data directly. When an administrator desires to track factors that cause significant changes in transactions, attributes thereof can be subsequently analyzed by training association rules across typically all features of the transaction (e.g., customer demographics, product sold, and the like). Accordingly, sub-slices such as Column/Value pairs employed as WHERE clauses, for which the aggregation of the target measure changes considerably between the original slices/sub-slices can be identified.

Figure 8:
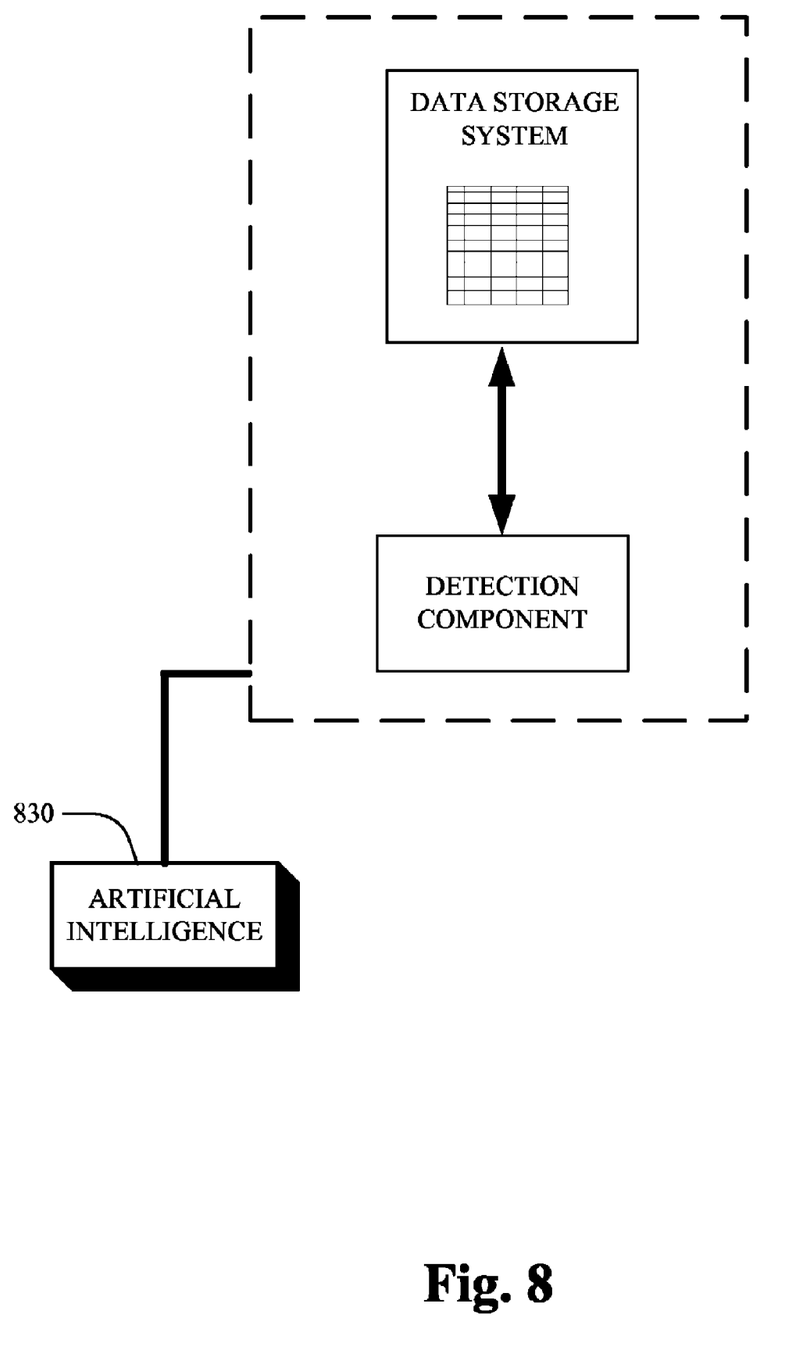
FIG. 8 illustrates an artificial intelligence component as part of a system in accordance with an exemplary aspect of the subject innovation.

FIG. 8 illustrates an artificial intelligence component 830 that can be employed to facilitate inferring and/or determining when, where, how to identify factors that cause shifts in transactions in accordance with an aspect of the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 830 can employ any of a variety of suitable AI-based schemes as described supra in connection with facilitating various aspects of the herein described invention. For example, a process for learning explicitly or implicitly how to detect most interesting sub-slices can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
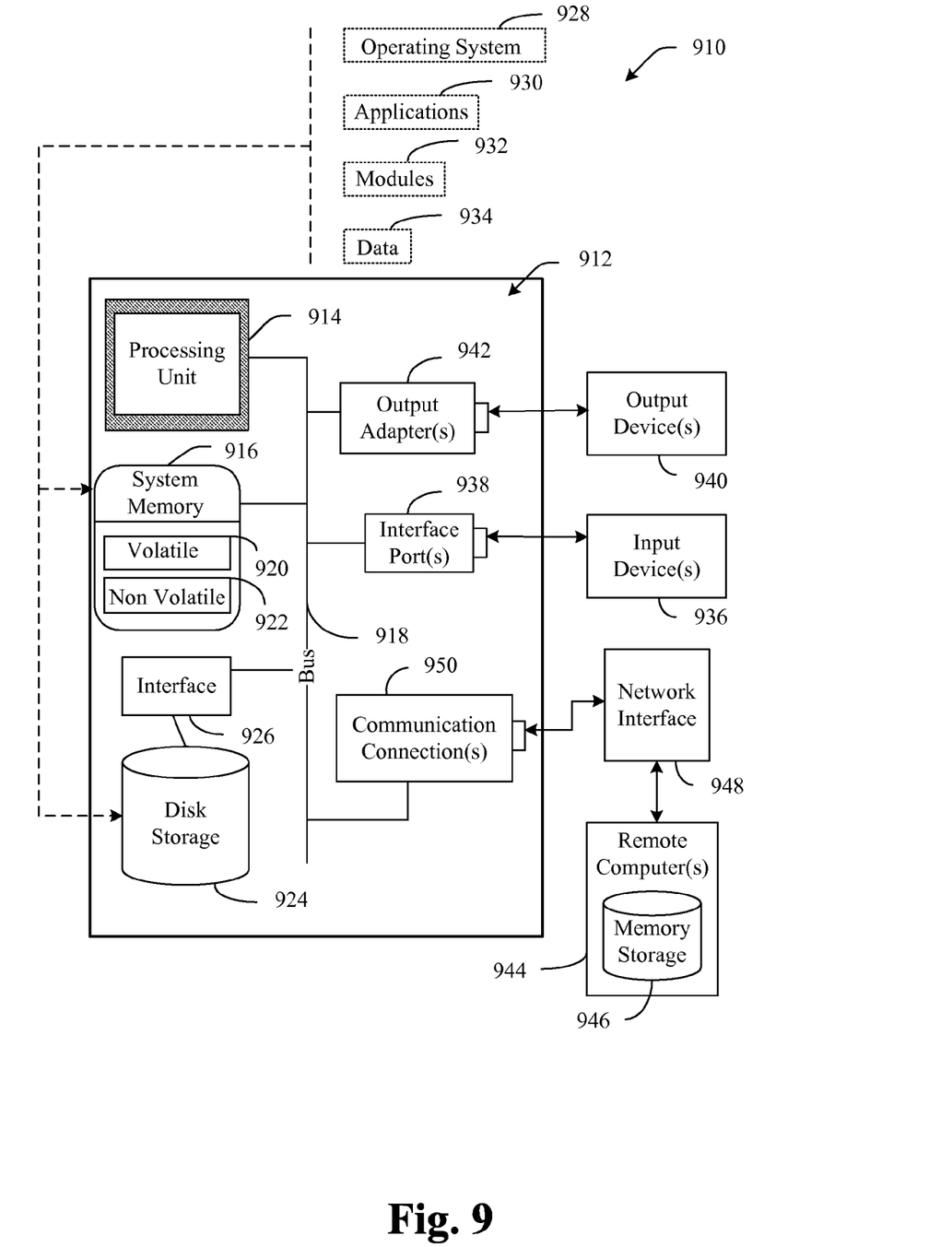
FIG. 9 illustrates a brief general description of a suitable computing environment wherein the various aspects of the subject innovation can be implemented.
Figure 10:
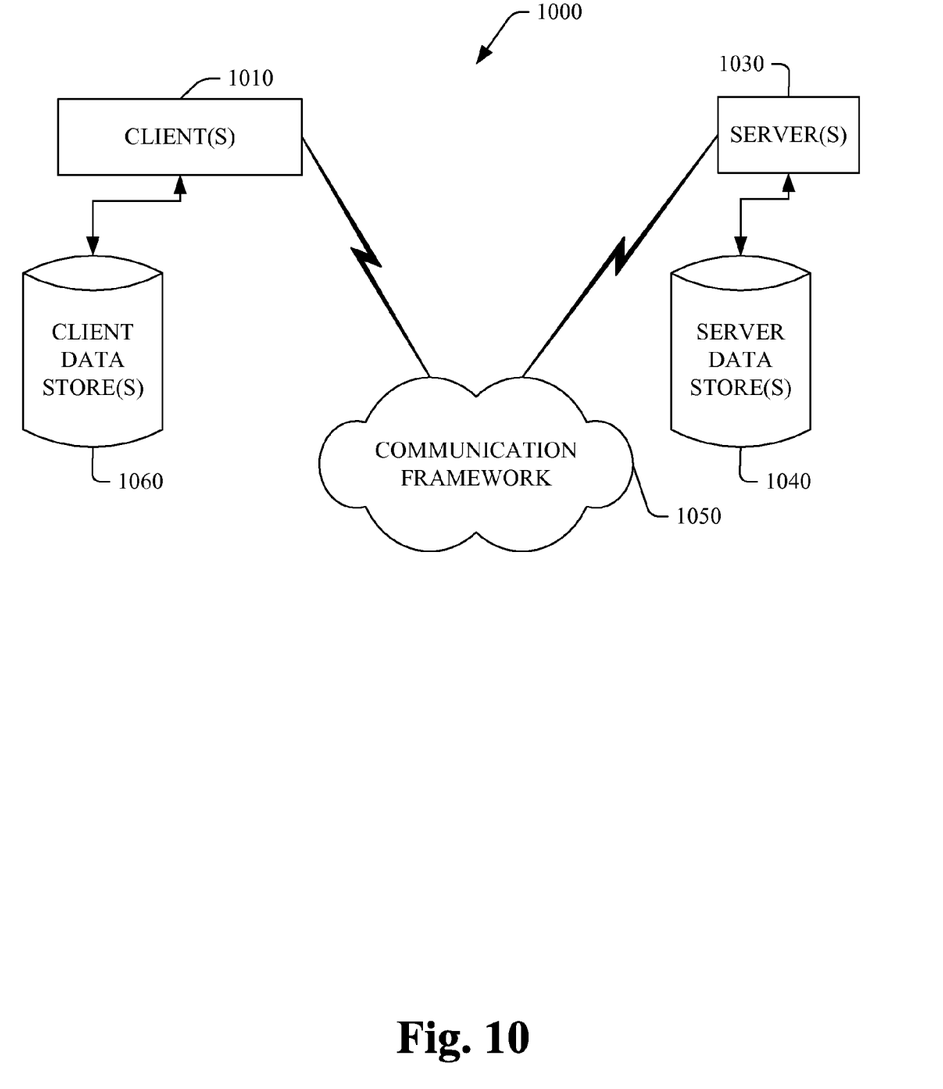
FIG. 10 illustrates a schematic diagram of a client—server system that can employ a detection component according to one aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed for implementing a detection component of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method for identification of factors that cause shifts in transactions in a data store, the method comprising the following computer executable acts:
   storing transactions within a storage environment;
   identifying factors correlated with a change in transactions, wherein the changes are greater than a predetermined threshold, and wherein the identification is performed via employing data mining techniques;
   grouping a plurality of subspaces into subreports;
   measuring a coverage for each subreport;
   sorting the measured subreports according to the total coverage of each subreport;
   determining a maximum coverage for the sorted subreports; and
   generating a final report with a total coverage for the sorted subreports.

2. The computer implemented method of claim 1 further comprising detecting a set of interesting sub spaces for a slice, wherein an interesting subspace is a group of transactions that exceed a minimum number of transactions or a group of transactions that narrowly project on an amount axis.

3. The computer implemented method of claim 1 further comprising selecting subspaces that display a variance beyond a predetermined threshold.

4. The computer implemented method of claim 3 further comprising:
   grouping the selected subspaces; and
   measuring a coverage.

5. The computer implemented method of claim 3 further comprising selecting a data sources from the storage environment in form of multi-dimensional data.

6. The computer implemented method of claim 1 further comprising creating association rules for each slice.

7. The computer implemented method of claim 1 further comprising grouping rules into sub-reports.

8. The computer implemented method of claim 7 further comprising inferring the factors via an AI component.

9. The computer implemented method of claim 7 further comprising displaying reports as tables.

10. A computer program product for identification of factors that cause shifts in transactions in a data store, the computer program product comprising one or more computer readable storage media having computer executable instructions encoded thereon which, when executed by one or more computer processors, performs the method of claim 1.

11. A computer implemented method comprising the following computer executable acts:
   storing transactions within a storage environment;
   identifying factors causing shifts in transactions beyond a predetermined threshold via employing data mining techniques;
   grouping rules into sub-reports; and
   defining a coverage score for a sub-report ($\Delta R$) as the maximum sum of subspace measures ($\Delta G_i$) across a subset(S) of subspaces with empty intersection given as:

$$\Delta R = \text{Max}\left(\sum_{G_i \in S} \Delta G_i \;\middle|\; G_i \cap G_j = \emptyset, \forall\, G_i, G_j \in S, i \neq j\right).$$

* * * * *